United States Patent [19]

Tewari

[11] Patent Number: 5,169,406
[45] Date of Patent: Dec. 8, 1992

[54] METHOD AND A DEVICE FOR PREPARING BRINE

[75] Inventor: Mohan P. Tewari, Columbus, Miss.
[73] Assignee: Eka Nobel AB, Surte, Sweden
[21] Appl. No.: 564,202
[22] Filed: Aug. 8, 1990
[51] Int. Cl.$^5$ .............................. C01D 1/30; B01F 1/00
[52] U.S. Cl. ................................ 23/293 R; 23/303; 422/275; 422/902; 423/658.5
[58] Field of Search ............... 423/659, 658.5; 23/303, 23/293 R; 422/275, 902

[56] References Cited

U.S. PATENT DOCUMENTS

| | | | |
|---|---|---|---|
| 203,981 | 5/1878 | Adamson | 422/275 |
| 409,234 | 8/1889 | Quinn | 422/902 |
| 928,966 | 7/1909 | Hardesty | 422/275 |
| 2,270,372 | 1/1942 | Huwter | 422/902 |
| 2,281,140 | 4/1942 | Courthope et al. | 422/902 |
| 2,395,258 | 2/1946 | Drake | 423/658.5 |
| 2,551,494 | 5/1951 | Kaufmann | 422/902 |
| 2,734,804 | 2/1956 | Courthope et al. | 422/902 |
| 3,168,379 | 2/1965 | Miller | 23/312 |
| 3,190,726 | 6/1965 | Rudelick et al. | 422/902 |
| 3,385,674 | 5/1968 | Kolasinski | 23/312 |
| 3,936,274 | 2/1976 | Leuerenz et al. | 422/902 |
| 4,224,035 | 9/1980 | Geesen | 23/303 |

FOREIGN PATENT DOCUMENTS 1009736 11/1965 United Kingdom .................. 23/303
2022448 12/1979 United Kingdom .................. 422/902

OTHER PUBLICATIONS

*The Sterling Lixate Process*, technical bulletin of "International Salt Company", Section Three, Brine Systems (1981).

*Primary Examiner*—Gary P. Straub
*Attorney, Agent, or Firm*—Burns, Doane, Swecker & Mathis

[57] ABSTRACT

The invention concerns a method of preparing brine by dissolving salt in water, the salt containing sodium chloride but also calcium sulfate and/or other soluble impurities with a slower dissolution rate than sodium chloride, wherein the salt is supplied to a vessel including a grid for supporting a salt bed, water is supplied and flows through and wets at least a portion of the salt bed before it flows through the grid, whereby small solid particles form and pass through the grid whereafter they are separated from the solution, said small particles containing essentially no sodium chloride.

The invention further concerns a device for making brine by dissolving salt in water, which device comprises a vessel containing a grid support, means for supplying solid salt, means for supplying water, means for the outflow of brine, and means for removing undissolved salt particles at the bottom of the vessel.

13 Claims, 1 Drawing Sheet

1

METHOD AND A DEVICE FOR PREPARING BRINE

BACKGROUND OF THE INVENTION

The present invention relates to a method of preparing brine by dissolving salt containing calcium sulfate or other impurities. The uptake of the impurities into the brine is reduced by supplying solid salt and water to a vessel including a grid for supporting a salt bed. The water flows through and dissolves the sodium chloride portion of the salt, while a great deal of the impurities pass through the grid whereafter they are removed from the solution. The invention also concerns a device for preparing brine by the method described.

Brine, i.e. an aqueous solution of sodium chloride, is used as a raw material in several electrochemical processes, such as production of sodium chlorate. The brine is often prepared by dissolving rock salt in water. Even if rock salt mainly consists of sodium chloride, it generally contains considerable amounts of other salts, such as calcium sulfate. One kg rock salt often contains as much as 20 g calcium. Calcium sulfate, as well as some other impurities, are less soluble than sodium chloride. It is desirable to obtain brine that is as concentrated as possible in respect of sodium chloride, preferably saturated.

In conventional processes for preparing brine, the water flows through a salt bed in a dissolving zone. Some of the calcium sulfate is dissolved and included in the brine, while some is set free and accumulates in the dissolving zone. Such processes involve two main problems.

Firstly, the brine produced contains a considerable amount of calcium sulfate, generally more than 400 mg calcium per liter. Especially the calcium must be removed before the brine is used in a chlorate process, which is done by reacting with soda ash. It is also desirable that the content of sulfate is as low as possible.

Secondly, the calcium sulfate as well as other impurities which is not dissolved accumulates in the dissolving zone and thus decreases the amount of sodium chloride available for dissolving. In other words, the contact surface between the sodium chloride and the water is decreasing and the contact surface between the impurities and the water is increasing during operation. After some time of operation, the brine produced will therefore be less concentrated in respect of sodium chloride but having a higher content of impurities, such as calcium sulfate. The dissolving device must then be taken out of operation and cleaned from calcium sulfate and other accumulated impurities.

SUMMARY OF THE INVENTION

Prior art does not disclose any method of avoiding the above mentioned problems of dissolving rock salt containing calcium sulfate or other soluble impurities. Any suitable device to be used is not disclosed either. It is therefore an object of the invention to provide an easy method of preparing brine by dissolving salt, such as rock salt, containing calcium sulfate and/or other soluble impurities, and obtaining brine with a lower content of such impurities than prior art methods. It is another object of the invention to provide a method of avoiding accumulation of impurities in the dissolving device by continuously removing undissolved matter, such as calcium sulfate, from the dissolving zone. It is still another object to provide a simple device to be used in a process according to the invention.

The objects of the invention can be achieved with a method and a device as claimed. The invention is based on the fact that the dissolution rate of calcium sulfate is slower than the dissolution rate of sodium chloride. The dissolution of calcium sulfate can therefore be minimized by minimizing the contact time and the contact surface between the calcium sulfate and the water, but still keeping the contact time and the contact surface between the sodium chloride and the water large enough for obtaining brine of desired concentration in respect of sodium chloride. Thus, the claimed invention concerns a method of preparing brine by dissolving salt in water, the salt containing sodium chloride but also calcium sulfate and/or other soluble impurities with a slower dissolution rate than sodium chloride, wherein the salt is supplied to a vessel including a grid for supporting a salt bed, water is supplied and flows through and wets at least a portion of the salt bed before it flows through the grid, whereby small solid particles form and pass through the grid whereafter they are separated from the solution. The solid particles mainly consist of calcium sulfate and other impurities, and contain substantially no sodium chloride. Accordingly, by the method of the invention the calcium sulfate and the other impurities are continuously removed from the wet portion of the salt bed, i.e. the dissolving zone. It is preferred that the grid is arranged substantially horizontally in the vessel and that the water is supplied above the grid, preferably through spray nozzles. If the water is supplied within the salt bed it will then flow through and wet the lower portion of the salt bed.

BRIEF DESCRIPTION OF THE DRAWING

The following detailed description should be read in conjunction with the Drawing, wherein.

DETAILED DESCRIPTION OF THE PREFERRED EMBODIMENTS

Figure 1:
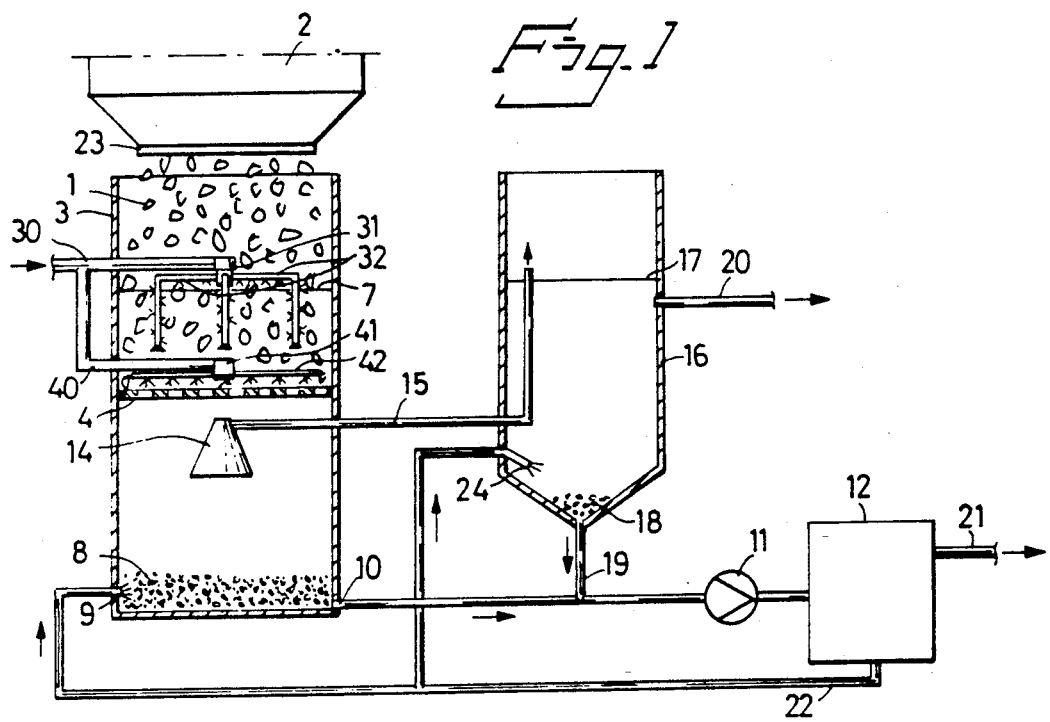
FIG. 1 illustrates schematically one embodiment of the apparatus of the invention.

It is often desirable to obtain brine that is saturated in respect of sodium chloride. In such cases the dissolution of impurities is reduced by keeping the contact time and the contact surface between the salt and the water just sufficient for obtaining a saturated solution of sodium chloride.

Suitably the flow of water is set so a steady state is obtained where the free volume of a lower portion of the salt bed as well as the space below the grid is filled with brine, whereby a dissolving zone defined by the grid and the upper level of brine forms. Suitable flow of water depends on the desired concentration of the brine, the salt used, the temperature and pH of the water, as well as on the size and design of the dissolving device. In most cases it is preferred that the average residence time of the water in the dissolving zone is kept from about 1.5 to about 5 minutes, preferably from about 1.8 to about 3 minutes, most preferably from about 2 to about 2.5 minutes. If the residence time is too low the brine will be less concentrated, and if it is too high the brine will include too much calcium sulfate or other impurities. In many cases it is preferred that the average residence time is kept just sufficient for obtaining a saturated solution of sodium chloride.

The water supplied should be distributed as uniformly as possible throughout the dissolving zone, which helps keeping a big contact surface between the sodium chloride and the water. Suitably it is supplied through a number of spray nozzles throughout the dissolving zone within the salt bed. The upper nozzles are then preferably situated just above the brine level, i.e. just above the dissolving zone, while the lower nozzles preferably are situated just above the grid. It has been found suitable to use from 1 to 10 spray nozzles per 100 liter volume of the dissolving zone.

The highest capacity is obtained if the openings in the grid supporting the salt bed constitutes as big share of the total area as possible, i.e. the free area is as big as possible. However obvious to any person of ordinary skill in the art that any design of the grid permits production of brine according to the invention, it is preferred that the grid has a free area of at least 20%, most preferably at least 50%. The free area of the grid, in addition of facilitating the outflow of brine, also allows undissolved particles of calcium sulfate and other impurities from the dissolving zone. Suitable size of the openings depends on the size distribution of the salt particles to be dissolved. If the salt particles ranges from about 1 to about 10 mm a preferred grid has openings with an effective size from about 1 to about 10 mm, most preferably from about 3 to about 8 mm. The shape of the openings is not critical.

It is preferred that the small particles passing through the grid are collected at the bottom of the vessel, wherefrom they are removed, continuously or discontinuously, e.g. with a scraper or by flushing water. Preferably they are removed discontinuously by stopping the supply of water to the dissolving zone, flushing water from one end at the bottom and pumping out the slurry from the other end at the bottom. It is suitable to separate the particles from the slurry and reuse the water for flushing.

Preferably the brine flows out from the vessel through a pipe situated below the grid and possibly through a mesh filter for stopping solid particles. It is also preferred to let the brine flow through a sedimentation tank to ensure that no solid particles are carried on to the process where the brine is used, such as a process of preparing sodium chlorate.

It has been found that the pick up of calcium sulfate into the brine can be further minimized if the water supplied has a pH value above 7. It is generally not economic to keep the pH value above 12. A preferred range is from about 9 up to about 11. Suitable pH value can be obtained by adding alkali metal hydroxide, such as sodium hydroxide, to the fresh water.

The pick up of calcium sulfate also decreases with increasing temperature, but above about 40° C. the improvement is small. Even if any temperature of the water supplied between 0° and 100° C. is possible the preferred temperature range is from about 20° to about 40° C., most preferably from about 30° to about 35° C.

The pick up of calcium sulfate may also be decreased if the water supplied contains sodium sulfate through common ion effect. It is possible to recirculate a portion of the brine for obtaining water containing sodium sulfate.

The invention also concerns a device for preparing brine by dissolving salt, such as rock salt, in water. The device comprises a vessel containing a preferably substantially horizontally arranged grid support, preferably with a free area of at least 20%, most preferably at least 50%, preferably above the grid situated means for supplying solid salt and means for supplying water, preferably including spray nozzles, most preferably including a number of spray nozzles distributed substantially uniformly in a zone above the grid. Further, it comprises means for the outflow of water, preferably including a pipe situated below the grid, a mesh filter, and a sedimentation tank. The device also comprises means for removing undissolved particles from the bottom of the vessel, preferably including at least one spray nozzle for flushing water and means for pumping out the slurry from the vessel.

By performing the present invention the brine produced contains only about 10 to 30 percent by weight of the calcium from the salt used as a raw material. The lower content of calcium will reduce the amount of soda ash consumed for purifying the brine prior to use. Some other impurities, such as barium and strontium will also be excluded to a high extent from the brine produced. A device according to the invention has a very high capacity and does not have to be taken out of operation for cleaning very often and the cleaning goes very quick.

A preferred embodiment of the invention will now be described in detail with reference to the drawings. However, it is obvious to any person with ordinary skill in the art that many other embodiments are possible within the scope of the invention defined by the claims.

Figure 2:
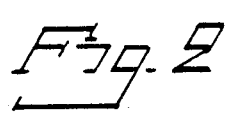
FIG. 2 is a top view of the apparatus.
Figure 3:
FIG. 3 is a sectional side view of a part of the dissolution vessel of the apparatus.

FIG. 1 schematically shows a plant for preparing brine by dissolving rock salt in water, FIG. 2 shows a top section of the dissolving device and FIG. 3 shows a side section of a portion of the dissolving device.

Referring to FIG. 1, a silo (2) for storing ground rock salt is situated above a cylinder shaped vessel (3) containing a horizontal grid (4) covering the entire cross section. The silo includes a knife gate (23) for supplying the salt to the vessel. A preferred grid (4) comprises a standard steel grating covered with a wire mesh determining the effective size of the openings. However, any construction of a grid with suitable free area and size of the openings can be used. Each one of two pipes (30, 40) is connected to a separate set of spray nozzles for fresh water. The nozzles are distributed substantially uniformly in a zone above the grid (4), i.e. the dissolving zone. The bottom of the vessel (3) includes spray nozzles (9) for flushing water and at least one outlet (10) at the opposite side connected to a pump (11). Downstream the pump (11) means (12) are provided for separation of solid particles from water, preferably including a sedimentation tank and a filter press. The vessel (3) further includes a funnel shaped brine outlet (14) with the opening faced downwards and situated below the grid (4). Preferably a mesh filter covers the opening of the funnel shaped outlet (14), which is connected to a pipe (15) ending in a sedimentation tank (16). A pipe (19) connects the bottom of the tank (16) to the pump (11). Another pipe (20) connects the tank (16) to a brine storage tank (not shown).

FIG. 2 shows a top view of the upper of the two sets of spray nozzles in the vessel (3). The water supply pipe (30) leads to a connection (31) in the center of the vessel (3). The connection forms the center of a star consisting of six pipes (32), each with a number of holes (33) functioning as spray nozzles, extending against the mantle of the vessel (3). The lower set of spray nozzles has a similar star-like shape from above except that there are eight pipes (42) extending from the connection (41) in the center of the vessel (3).

FIG. 3 shows a side section of a portion of the vessel (3) from the center to the mantle. Only one of six upper pipes (32) and one of eight lower pipes (42) are shown. The salt particles in the bed are also omitted. It appears that each one of the upper pipes (32) has a horizontal portion (35) and a vertical portion (36). The holes (33) are uniformly distributed along the pipes (32) in both the sections (35, 36). The vertical portion (36) ends with a conical spray nozzle (37). The lower set of spray nozzles consists of a water supply pipe (40) leading to a connection (41) in the center of the vessel (3) and pipes (42), each with a number of uniformly distributed holes (43) functioning as spray nozzles, extending from the connection (41) against the mantle of the vessel (3). The pipes (42) have no vertical portions and no spray nozzles at their ends. Preferred size of the holes (33, 43) is from about 1 to about 6 mm. However, it is obvious to any person with ordinary skill in the art that any construction of the water supply means that gives a uniform distribution of water in the lower portion of the salt bed, i.e. the dissolving zone, may be used in the present invention. For instance, the number of pipes (32, 42) extending from the connections (31, 41) could be anything from 3 to 25 in each set of spray nozzles depending on the size of the vessel (3).

A preferred method of preparing brine according to the invention will now be described with reference to the FIGS. 1, 2 and 3. Ground rock salt stored in the silo (2) is supplied to the vessel (3) and forms a salt bed (1) filling the entire volume between the grid (4) and the silo (2). Water is distributed uniformly throughout the dissolving zone by spraying through the holes or nozzles (33, 37, 42) in the pipes (32, 41). The water flows through and wets the lower portion of the salt bed (1), i.e. the dissolving zone, and dissolves at least the sodium chloride. The brine thus obtained fills the volume below the grid (4), i.e. the settling zone, as well as the free volume of the dissolving zone within the salt bed (1). Its level (7) is kept just below the horizontal portion (35) of the pipes (32) in the upper set of spray nozzles. The water flow is kept just sufficient to obtain a saturated sodium chloride solution, whereby small particles mainly consisting of calcium sulfate form. These particles (8), as well as small particles of insoluble material, such as sand and small stones etc, continuously fall through the grid (4) and settle at the bottom. Big insoluble material, such as wood chips, wires, stones etc, are collected on the grid. Brine flows through the outlet (14) to the sedimentation tank (16), where it is separated from particles carried on, and finally flows through the pipe (20) to a storage tank. At steady state the brine in the vessel (3) and in the sedimentation tank (16) will automatically be at the same level (7, 17). Before the top level of the particles (8) collected at the bottom of the vessel (3) comes too close to the brine outlet (14), generally about every 5 to 20 hours, they have to be removed. At this point, the inlet water to the dissolving zone of the vessel (3) is stopped and flush water is sprayed through the nozzles (9) and the slurry is pumped out through the outlet (10) to the device (12) where the solid particles are separated from the water which is recirculated. The brine produced flows through the outlet (14) and the pipe (15) to the sedimentation tank (16), where solid particles carried on fall to the bottom. These particles (18) are removed in a similar way. Water is flushed through the nozzle (24) and the particles (18) are pumped out through the pipe (19) and the pump (11). The brine from the sedimentation tank (16) is led through the pipe (20) to a brine storage tank. After dissolving about 300 to 1000 tons of rock salt the grid (4) has to be cleaned. At this point, the supply of rock salt is stopped by closing the knife gate (23) and the water supply is continued to dissolve the remaining salt above the grid. When there is no soluble salt left, the grid is cleaned manually and the unit restarted.

EXAMPLE

A full scale dissolver according to the drawings was used for dissolving ground rock salt containing 1.0 to 1.2 percent $CaSO_4$ by weight on an average. Less than 10% of the particles were bigger than 10 mm and less than 20 were smaller than 1 mm. The volume of the dissolving zone was 970 liters, the volume of the settling zone was 2200 liters and the cross section area was 1.8 $m^2$. The grid was made from standard steel gratings of $25 \times 25 \times 102$ mm size covered with wire mesh reducing the effective opening to 6 mm. The height of the salt bed was 1.2 m. Water was supplied with a flow varying from 341 to 416 liters/minute through the upper set of spray nozzles and from 76 to 151 liters/minute through the lower set. The total flow was varying from 420 to 541 liters/minute. Thus the average residence time of water in the dissolving zone was varying from 2.0 to 2.6 minutes. The concentration of NaCl in the brine produced varied from 290 to 300 g/liter. When the pH of the brine varied from 6.1 to 6.7 the concentration of calcium in the brine varied from 195 to 308 mg/liter. When the pH varied from 9.1 to 11.1 the calcium content varied from 74.4 to 141 mg/liter.

I claim:

1. A method of preparing concentrated brine from a sodium chloride salt containing one or more slightly soluble impurities having an aqueous dissolution rate lower than that of sodium chloride, comprising the steps of:
   (1) supplying salt to form a salt bed on a horizontal grid in a vessel;
   (2) maintaining at least a portion of the salt bed in process liquid;
   (3) forming a brine solution by at least partially dissolving the wetted portion of the salt bed in the process liquid;
   (4) supplying a first portion of water to a plurality of horizontally spaced locations in the vessel, each location distributing water into the salt bed;
   (5) supplying a second portion of water at a location below the first water supply and above and proximate to the grid, said second water portion being supplied at a location and in sufficient quantities to just deplete residual salt values without brine dilution, thereby freeing substantially all small solid particulates of said impurities from said supplied salt;
   (6) passing the brine and the small solid particulates of said slightly soluble impurities through the grid and out of the salt bed into a settling zone; and
   (7) separating the brine from said small solid particulates by removing the brine at a position below the grid and above the solid settled particulates prior to the brine becoming saturated in said impurities.

2. A method as claimed in claim 1, wherein the average residence time of water in the dissolving zone is just sufficient for obtaining a saturated solution of sodium chloride.

3. A method as claimed in claim 1, wherein the average residence time of the water in the dissolving zone is from about 1.5 to about 5 minutes.

4. A method as claimed in claim 1, wherein the grid has a free area of at least 20%.

5. A method as claimed in claim 1, wherein the small particles passing through the grid are collected at the bottom of the settling zone, wherefrom they are removed.

6. A method as claimed in claim 5, wherein the undissolved particles at the bottom of the settling zone are removed by stopping the supply of water to the salt bed, removing the brine, then, flushing water from one end of the settling zone and pumping out the resultant slurry from the other end.

7. A method as claimed in claim 2, including the step of passing the brine out from the vessel through a pipe situated below the grid.

8. A method as claimed in claim 1, wherein the water supplied has a pH value above about 7.

9. A apparatus as claimed in claim 1, wherein the grid has a free area of at least 20%.

10. A method as claimed in claim 1, wherein the small solid particles include calcium sulfate.

11. A method as claimed in claim 1, wherein the salt bed in the vessel includes small particles of insoluble impurities, and wherein the small particles of insoluble impurities pass through the grid and out of the salt bed together with the brine and small solid particles of soluble impurities.

12. An apparatus for preparing brine from sodium chloride salt containing one or more slightly soluble impurities having an aqueous dissolution rate lower than that of sodium chloride, comprising:
(1) a vessel containing a horizontal grid for supporting a salt bed, said grid containing openings having a size permitting said lightly soluble impurities to pass therethrough and settle into a settling zone;
(2) a plurality of spaced upper conduits each having a first portion positioned substantially horizontally above said salt bed and a second portion extending downwardly into said salt bed, said first and second conduit portions having a plurality of spaced apertures therein for substantially uniform distribution of water into an upper portion of said salt bed;
(3) a lower conduit extending substantially horizontally into said salt bed below said upper conduit and proximate said grid and having a plurality of spaced apertures therein for distribution of water into said salt bed at a location and in sufficient quantity to just deplete residual salt values without brine dilution; and
(4) a brine outlet in said settling zone located below said grid and above the bottom of the settling zone, said outlet providing for removal of brine from said vessel prior to the brine becoming saturated in said impurities.

13. An apparatus as claimed in claim 12 which includes means for removing undessalred particulates, said means including at least one spray nozzle at one end of the settling zone and means for pumping the resultant slurry form the cutter end of the settling zene.

* * * * *